United States Patent [19]
Davidson

[11] Patent Number: 5,945,668
[45] Date of Patent: Aug. 31, 1999

[54] FIBER OPTIC SYSTEM WITH OPEN FIBER SAFETY INTERLOCK

[75] Inventor: Howard L. Davidson, San Carlos, Calif.

[73] Assignee: Sun Microsystems, Inc., Palo Alto, Calif.

[21] Appl. No.: 08/879,506

[22] Filed: Jun. 20, 1997

[51] Int. Cl.⁶ .............................. G02B 6/32; H01S 3/097
[52] U.S. Cl. ........................................ 250/227.15; 385/88
[58] Field of Search ........................ 250/227.15, 227.16; 385/88

[56] References Cited

U.S. PATENT DOCUMENTS

| | | |
|---|---|---|
| 5,113,467 | 5/1992 | Peterson et al. . |
| 5,329,541 | 7/1994 | Brown ........................................ 385/88 |

*Primary Examiner*—Stephone Allen
*Attorney, Agent, or Firm*—Conley, Rose & Tayon, PC; B. Noel Kivlin

[57] ABSTRACT

An open fiber safety interlock that disables the light transmitter whenever the cable is disconnected or broken. In one embodiment, a cable containing an optical fiber and an electrical conductor is coupled between a local receiver and a remote transmitter. The remote transmitter transmits a light signal to the local receiver via the optical fiber. The power for the remote transmitter is provided to the remote transmitter via the electrical conductor from a local power supply. Disconnecting or breaking the cable results in a loss of power to the transmitter, thereby halting any further light emissions. Broadly speaking, the present invention contemplates a remote module which implements an open fiber safety interlock. The remote module comprises a transmitter for transmitting light through an optical fiber in a cable, where the cable includes an electrical conductor. The transmitter is configured to transmit light when the cable is coupled to the remote module and a voltage is applied to the electrical conductor. The present invention further contemplates an open fiber safety interlock comprising an electrical conductor, a transmitter, and a power supply. The electrical conductor is part of a cable having an optical fiber for transporting a light beam. The transmitter is configured to provide the light beam, and the power supply is coupled to power the transmitter via the electrical conductor.

10 Claims, 2 Drawing Sheets

FIBER OPTIC SYSTEM WITH OPEN FIBER SAFETY INTERLOCK

BACKGROUND OF THE INVENTION

1. Field of the Invention

This invention relates generally to the field of optical systems, and more particularly to safety interlocks for preventing accidental exposure to concentrated light beams conveyed by optical fibers.

2. Description of the Related Art

Optical fiber interconnections used for data communications or telecommunications applications usually operate in the near infrared. Typical wavelengths of these links, i.e. those used in most commercial fiber systems, are 830 nm, 1.3 $\mu$m, and 1.55 $\mu$m. These wavelengths are invisible to human vision, but may be focused by the human eye. This produces a potential hazard when a person looks into the end of an apparently dark fiber that is connected to an operating transmitter, or into the transmitter itself.

A transmitter for coupling a modulated light signal to a optical fiber transmission line produces a narrow cone of light at the exit of the transmitter or at the exit of the optical fiber. To mitigate the hazard, legal requirements exist to regulate the amount of external radiation when an optical fiber coupler is disconnected. These pose an obstacle to use of lasers with optical fiber channels. Existing systems have overcome this obstacle through the use of safety interlocks. These have taken the form of mechanical shutters that cover the end of unplugged fiber cables and other coupler-engagement sensing schemes which fail to address the danger of a broken or cut cable.

An electronic scheme which monitors for reflection from an open end has also been implemented, but involves pulsing the transmitter at a low duty cycle. While this keeps the radiation dosage below the retina-damage threshold, it adds significant complexity and cost to the transceiver.

As fiber optic systems become adapted to a greater number of everyday applications, fiber optic cables will become more accessible to the general public, and a consequent increase in danger of retinal damage will result. A need exists for an inexpensive fail-safe interlock that is not easily damaged or defeated, and which prevents accidental radiation exposure in the event of a broken or cut optical fiber cable without reducing the available data transmission bandwidth.

SUMMARY OF THE INVENTION

The problems outlined above are in large part solved by an optical system including an open fiber safety interlock that disables a light transmitter whenever an associated cable is disconnected or broken. In one embodiment, a cable containing an optical fiber and an electrical conductor is coupled between a local receiver and a remote transmitter. The remote transmitter transmits a light signal to the local receiver via the optical fiber. The power for the remote transmitter is provided to the remote transmitter via the electrical conductor from a local power supply. Disconnecting or breaking the cable results in a loss of power to the transmitter, thereby halting any further light emissions.

Broadly speaking, the present invention contemplates a remote module which implements an open fiber safety interlock. The remote module comprises a transmitter for transmitting light through an optical fiber in a cable, where the cable includes an electrical conductor. The transmitter is configured to transmit light when the cable is coupled to the remote module and a voltage is applied to the electrical conductor.

The present invention further contemplates an optic system which implements an open fiber safety interlock. The optic system comprises a cable, a remote module, and a local module. The cable includes an optical fiber and an electrical conductor. The remote module includes a transmitter for transmitting light through the optical fiber. The local module includes a receiver for sensing light transmitted through the optical fiber and a power supply configured to supply power to the transmitter via the electrical conductor only if the cable is unbroken and properly coupled to both the local and remote modules.

The present invention still further contemplates an open fiber safety interlock comprising an electrical conductor, a transmitter, and a power supply. The electrical conductor is part of a cable having an optical fiber for transporting a light beam. The transmitter is configured to provide the light beam, and the power supply is coupled to power the transmitter via the electrical conductor.

BRIEF DESCRIPTION OF THE DRAWINGS

Other objects and advantages of the invention will become apparent upon reading the following detailed description and upon reference to the accompanying drawings in which.

Figure 1:
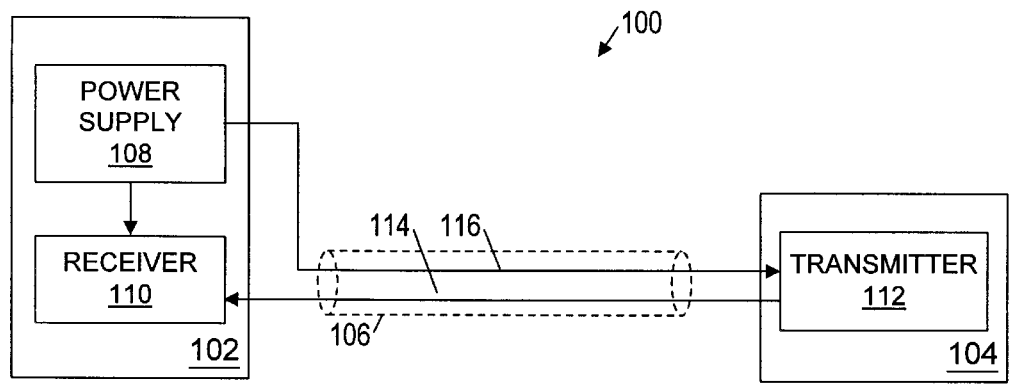
FIG. 1 is an optical fiber system which implements an open fiber safety interlock.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 shows an optical fiber system 100 which implements an open fiber safety interlock. The optical fiber system 100 includes a local module 102 which couples to a remote module 104 via a cable 106. The local module 102 includes a power supply 108 and a receiver 110. The remote module 104 includes a transmitter 112. The cable 106 includes an optical fiber 114 and an electrical conductor 116. The transmitter 112 is coupled to one end of the optical fiber 114 and to one end of the electrical conductor 116. The receiver 110 is coupled to the other end of the optical fiber 114. The power supply 108 is coupled to the other end of the electrical conductor 116 and to the receiver 110.

As long as the cable 106 of the optical fiber system 100 is unbroken and properly coupled at both ends, it transports a light beam from transmitter 112 to receiver 110 in accordance with a designated communications protocol. The cable 106 also transports power for transmitter 112 from power supply 108 in local module 102. Any break in the cable 106 removes power from transmitter 112, thereby disabling it and preventing any external light radiation from a broken optical fiber which could cause retinal damage. Similarly, disconnecting either end of the cable 106 disables transmitter 112.

Remote module 104 operates to provide high speed data communication to local module 102 via an optical link. Examples of remote modules include sensors and computer graphics generators. To this end, remote module 104 includes the transmitter 112. Transmitter 112 is a source of a modulated light beam and it is adapted to couple with the optical fiber 114 and the electrical conductor 116 in cable 106. Optical fiber 114 transports the modulated light beam along its length.

Transmitter 112 transmits a light beam only if it is powered. The transmitter 112 receives its power via electrical conductor 116. Since a closed electrical circuit is necessary for supply of power, a return path is necessary. It is not necessary that the return path be included in cable 106, although that is certainly allowable. The return path may also be provided via a separate cable or through use of a common ground connection.

Local module 102 operates to receive high speed data communication from remote module 104 via an optical link. Examples of local modules include data recording and processing equipment, and data display equipment. Local module 102 includes the receiver 110 which is adapted to couple with the optical fiber 114 to receive the modulated light beam. Local module 102 also includes the power supply 108 which is adapted to couple with the electrical conductor 116.

Power supply 108 supplies power to both receiver 110 and transmitter 112. In one embodiment, power supply 108 is configured as a current source. This advantageously compensates for any resistive power losses in electrical conductor 116. It is expected that the power supplied to the transmitter would be less than 1 Watt at about 5 Volts.

The safety interlock implemented in optical system 100 is based on the concept that if the optical path between transmitter 112 and receiver 110 is broken, then transmitter 112 is separated from its power supply 108. This safety interlock also finds application in optical systems with bi-directional communications as shown in FIG. 2.

Figure 2:
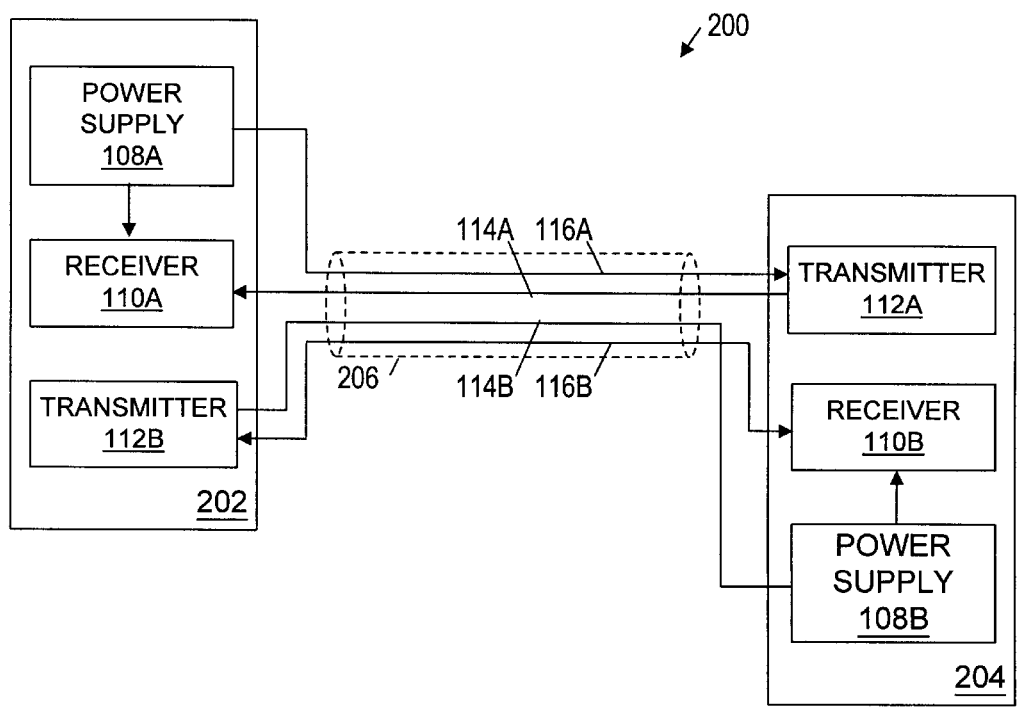
FIG. 2 is a bi-directional optical fiber system which implements a two-way open fiber safety interlock.

FIG. 2 shows an optical system 200 having a local module 202 coupled to a remote module 204 by a cable 206. Optical system 200 includes a power supply 108A, a receiver 110A, a transmitter 112A, an optical fiber 114A, and an electrical conductor 116A, each of which functionally correspond to the similarly numbered parts of FIG. 1. In mirror-image fashion, optical system 200 includes a power supply 108B, a receiver 110B, a transmitter 112B, an optical fiber 114B, and an electrical conductor 116B, each of which also functionally correspond to the similarly numbered parts of FIG. 1 to transmit power and a modulated light beam in directions opposite those of FIG. 1 (i.e. the light beam travels from the local module to the remote module on optical fiber 114B, and the power is provided from the power supply 108B in the remote module to the transmitter 112B in the local module). Disconnecting or breaking cable 206 thereby isolates both transmitters 112A and 112B from both their respective power supplies 108A and 108B. As before, this disables the transmitters, and prevents accidental exposure to external light radiation.

Figure 3:
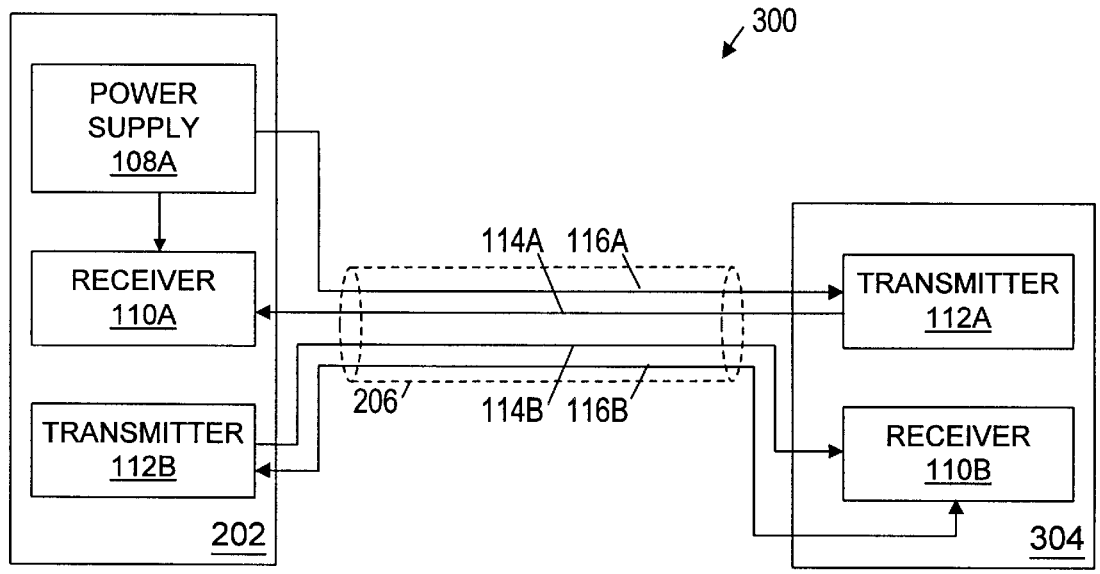
FIG. 3 is a bi-directional optical fiber system which implements a two-way open safety interlock with only a single power supply.

It may not always be feasible to have a power supply in the remote module. In this case, the configuration of optical system 300 shown in FIG. 3 may be used. Parts which functionally correspond to parts in FIG. 2 are numbered identically. A remote module 304 is powered by power supply 108A via electrical conductor 116A. A connection is made inside remote module 304 to provide an electrical path between electrical conductor 116A and electrical conductor 116B. In essence, the power supply for remote module 304 is connected to electrical conductor 116B even though the power supply does not reside in remote module 304.

In a proposed application, system 300 comprises a computer (local module 202) and a remotely placed display device (remote module 304). In this application, the open fiber safety interlock advantageously mitigates the hazard of exposure to external light radiation from an easily accessible optical fiber cable without significantly increasing the cost of the system.

Figure 4:
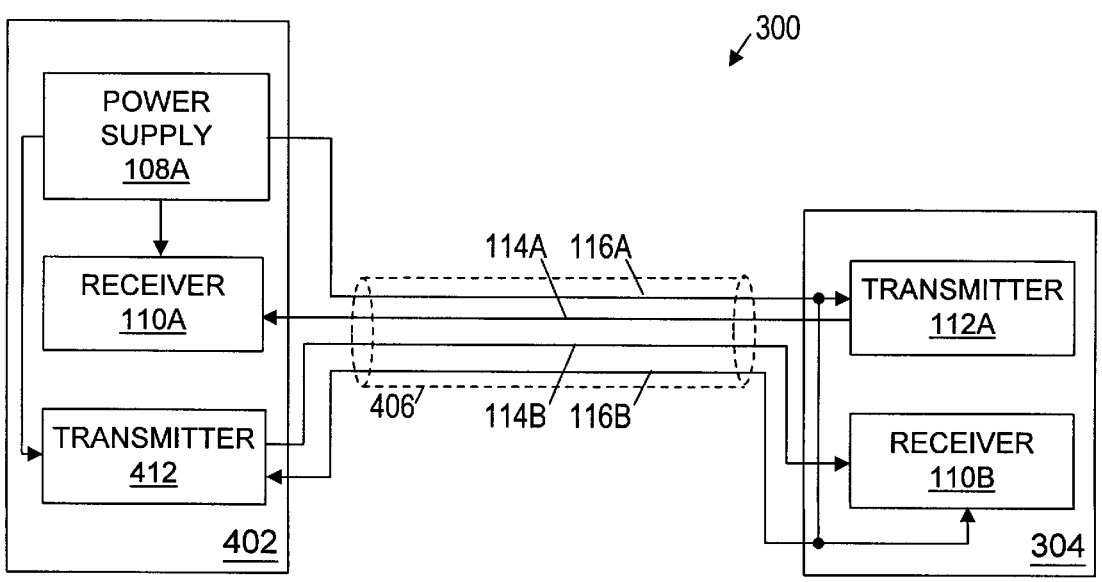
FIG. 4 is an optical fiber system which implements an alternate embodiment of the open fiber safety-interlock.

An alternate embodiment of optical system 300 is shown in FIG. 4. Parts which functionally correspond to parts shown in previous figures are numbered identically. Local module 402 includes a transmitter 412 which is powered by the local power supply 108A. However, transmitter 412 is disabled (i.e. does not transmit a light beam) unless it receives an asserted signal voltage via electrical conductor 116B. This reduces resistive power losses that might result from powering transmitter 412 via electrical conductor 116B. This implementation might be particularly suited for use in system 300 where the remote module 304 is powered from local power supply 108A.

Numerous variations and modifications will become apparent to those skilled in the art once the above disclosure is fully appreciated. It is intended that the following claims be interpreted to embrace all such variations and modifications.

What is claimed is:

1. A remote module which implements an open fiber safety interlock, wherein the remote module comprises a transmitter, for transmitting light through an optical fiber contained in a cable connected to said remote module, wherein the cable includes an electrical conductor configured to connect to a local module comprising a power supply and further configured to power said transmitter through said electrical conductor when said cable is connected to said remote module and to said local module, and wherein the transmitter is configured to transmit light when a voltage is applied to the electrical conductor while the cable is coupled to the local module and to the remote module.

2. The remote module as recited in claim 1, wherein the local module further comprises a receiver configured to received light transmission through said optical fiber when said cable is connected to said local module.

3. The remote module as recited in claim 1, further comprising:

a receiver for receiving light from a second optical fiber in the cable; and a power supply for powering a second transmitter for transmitting light through the second optical fiber in the cable, wherein the power is supplied via a second electrical conductor in the cable when the second fiber is coupled to the second transmitter.

4. An optic system which implements an open fiber safety interlock, wherein the optic system comprises:

a cable which includes:
 a first optical fiber; and
 a first electrical conductor;

a remote module which includes a first transmitter for transmitting light through the first optical fiber; and a local module which includes:

a first receiver for sensing light transmitted through the first optical fiber; and a first power supply configured to supply power to the first transmitter via the first electrical conductor only if the cable is unbroken and properly coupled to both the local module and remote module.

5. The optic system as recited in claim 4, wherein the cable includes a second optical fiber and a second electrical conductor, and wherein the local module further includes a second transmitter for transmitting light through the second optical fiber, and wherein the second transmitter is powered via the second electrical conductor only when the cable is unbroken and coupled at both ends.

6. The optic system as recited in claim 5, wherein the remote module provides an electrical path between the first and second electrical conductors when the cable is coupled to the remote module.

7. The optic system as recited in claim 5, wherein the remote module further includes a second power supply configured to supply power to the second transmitter via the second electrical conductor only when the cable is unbroken and coupled at both ends.

8. An open fiber safety interlock comprising:

a first electrical conductor in a cable having a first optical fiber for transporting a first light beam;

a first transmitter configured to provide the first light beam; and a first power supply coupled to power the first transmitter via the first electrical conductor;

a second electrical conductor in the cable, wherein the cable includes a second optical fiber for transporting a second light beam in a direction opposite the first light beam; and a second transmitter configured to provide the second light beam, wherein the second transmitter is powered via the second electrical conductor.

9. The open fiber safety interlock of claim 8, further comprising a link which provides an electrical path between the first and second electrical connectors when the first optical fiber is coupled to the first transmitter.

10. The open fiber safety interlock of claim 8, further comprising a second power supply coupled to power the second transmitter via the second electrical conductor.

* * * * *